(12) United States Patent
Machino et al.

(10) Patent No.: US 12,169,965 B2
(45) Date of Patent: Dec. 17, 2024

(54) INFORMATION PROCESSING APPARATUS AND INFORMATION PROCESSING METHOD

(71) Applicant: SONY SEMICONDUCTOR SOLUTIONS CORPORATION, Kanagawa (JP)

(72) Inventors: Yuki Machino, Kanagawa (JP); Seiichi Aoyagi, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 18/255,701

(22) PCT Filed: Oct. 22, 2021

(86) PCT No.: PCT/JP2021/039048
§ 371 (c)(1),
(2) Date: Jun. 2, 2023

(87) PCT Pub. No.: WO2022/123929
PCT Pub. Date: Jun. 16, 2022

(65) Prior Publication Data
US 2024/0104919 A1 Mar. 28, 2024

(30) Foreign Application Priority Data

Dec. 10, 2020 (JP) ................. 2020-205278

(51) Int. Cl.
*G06V 10/94* (2022.01)
*G06F 3/042* (2006.01)
(Continued)

(52) U.S. Cl.
CPC .......... *G06V 10/945* (2022.01); *G06F 3/0425* (2013.01); *G06F 3/0488* (2013.01);
(Continued)

(58) Field of Classification Search
CPC ............ G06V 10/945; G06V 30/1444; G06V 30/191; G06V 30/20; G06V 40/28;
(Continued)

(56) References Cited

U.S. PATENT DOCUMENTS

2013/0257720 A1\* 10/2013 Noda ................. G06V 40/28
345/157

FOREIGN PATENT DOCUMENTS

JP   2001-282785 A   10/2001
JP   2013-205983 A   10/2013
(Continued)

OTHER PUBLICATIONS

International Search Report and Written Opinion of PCT Application No. PCT/JP2021/039048, issued on Dec. 7, 2021, 09 pages of ISRWO.

*Primary Examiner* — Brent D Castiaux
(74) *Attorney, Agent, or Firm* — CHIP LAW GROUP

(57) ABSTRACT

Provided is an information processing apparatus capable of improving detection accuracy of a position pointed by a target object. An acquisition unit acquires a distance image indicating a distance to each object present within a predetermined range. Subsequently, a vector calculation unit calculates a vector extending from the target object present within the predetermined range in a direction pointed by the target object on the basis of the acquired distance image. Subsequently, an intersection calculation unit calculates a position of an intersection of a predetermined surface present within the predetermined range and the calculated vector on the basis of the acquired distance image. Subsequently, a processing execution unit executes processing corresponding to the calculated position of the intersection.

14 Claims, 11 Drawing Sheets

(51) Int. Cl.
*G06F 3/0488* (2022.01)
*G06T 7/73* (2017.01)
*G06V 30/14* (2022.01)
*G06V 30/19* (2022.01)
*G06V 30/20* (2022.01)
*G06V 40/20* (2022.01)
*G06F 3/04842* (2022.01)

(52) U.S. Cl.
CPC ............ *G06T 7/74* (2017.01); *G06V 30/1444* (2022.01); *G06V 30/191* (2022.01); *G06V 30/20* (2022.01); *G06V 40/28* (2022.01); *G06F 3/04842* (2013.01); *G06F 2203/04101* (2013.01); *G06T 2200/24* (2013.01); *G06T 2207/10028* (2013.01); *G06T 2207/20081* (2013.01); *G06T 2207/30176* (2013.01); *G06T 2207/30196* (2013.01)

(58) Field of Classification Search
CPC .... G06V 30/40; G06V 40/107; G06V 40/113; G06F 3/0425; G06F 3/0488; G06F 3/04842; G06F 2203/04101; G06F 40/10; G06T 7/74; G06T 220/24; G06T 2207/10028; G06T 2207/20081; G06T 2207/30176; G06T 2207/30196; G06T 2200/24; G06T 7/00; G06T 7/70; H04N 1/00331; H04N 1/19594
See application file for complete search history.

(56) References Cited

FOREIGN PATENT DOCUMENTS

| | | | |
|---|---|---|---|
| JP | 2016184203 | A * | 10/2016 |
| JP | 6643825 | B2 | 2/2020 |

* cited by examiner

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2021/039048 filed on Oct. 22, 2021, which claims priority benefit of Japanese Patent Application No. JP 2020-205278 filed in the Japan Patent Office on Dec. 10, 2020. Each of the above-referenced applications is hereby incorporated herein by reference in its entirety.

TECHNICAL FIELD

The present disclosure relates to an information processing apparatus and an information processing method.

BACKGROUND ART

Conventionally, there has been proposed an information processing apparatus that acquires a distance image indicating a predetermined surface determined in advance and a distance to a target object existing above the predetermined surface, and specifies a touch position of the target object on the predetermined surface from the acquired distance image (see, for example, Patent Document 1). In the information processing apparatus described in Patent Document 1, a user touches a character and the like displayed on the predetermined surface with the target object, and the touch position of the target object on the predetermined surface is detected, so that a display position of the character and the like selected by the user on the predetermined surface can be specified.

CITATION LIST

Patent Document

Patent Document 1: Japanese Patent No. 6643825

SUMMARY OF THE INVENTION

Problems to be Solved by the Invention

However, in the information processing apparatus described in Patent Document 1, since the user touches the predetermined surface with the target object, the predetermined surface and the target object are assimilated in the distance image, and there is a possibility that recognition accuracy of the target object decreases. Therefore, there is a possibility that detection accuracy of the touch position of the target object (that is, a position pointed by the target object) decreases.

An object of the present disclosure is to provide an information processing apparatus and an information processing method capable of improving detection accuracy of a position pointed by a target object.

Solutions to Problems

An information processing apparatus of the present disclosure includes: (a) an acquisition unit that acquires a distance image indicating a distance to each object present within a predetermined range; (b) a vector calculation unit that calculates a vector extending from a target object present within the predetermined range in a direction pointed by the target object on the basis of the distance image acquired by the acquisition unit; (c) an intersection calculation unit that calculates a position of an intersection of a predetermined surface present within the predetermined range and the vector calculated by the vector calculation unit on the basis of the distance image acquired by the acquisition unit; and (d) a processing execution unit that executes processing according to the position of the intersection calculated by the intersection calculation unit.

Furthermore, an information processing method of the present disclosure includes: (a) acquiring a distance image indicating a distance to each object present within a predetermined range; (b) calculating a vector extending from a target object present within the predetermined range in a direction pointed by the target object on the basis of the acquired distance image; (c) calculating a position of an intersection of a predetermined surface present within the predetermined range and the calculated vector on the basis of the acquired distance image; and (d) executing processing according to the calculated position of the intersection.

MODES FOR CARRYING OUT THE INVENTION

Figure 1:
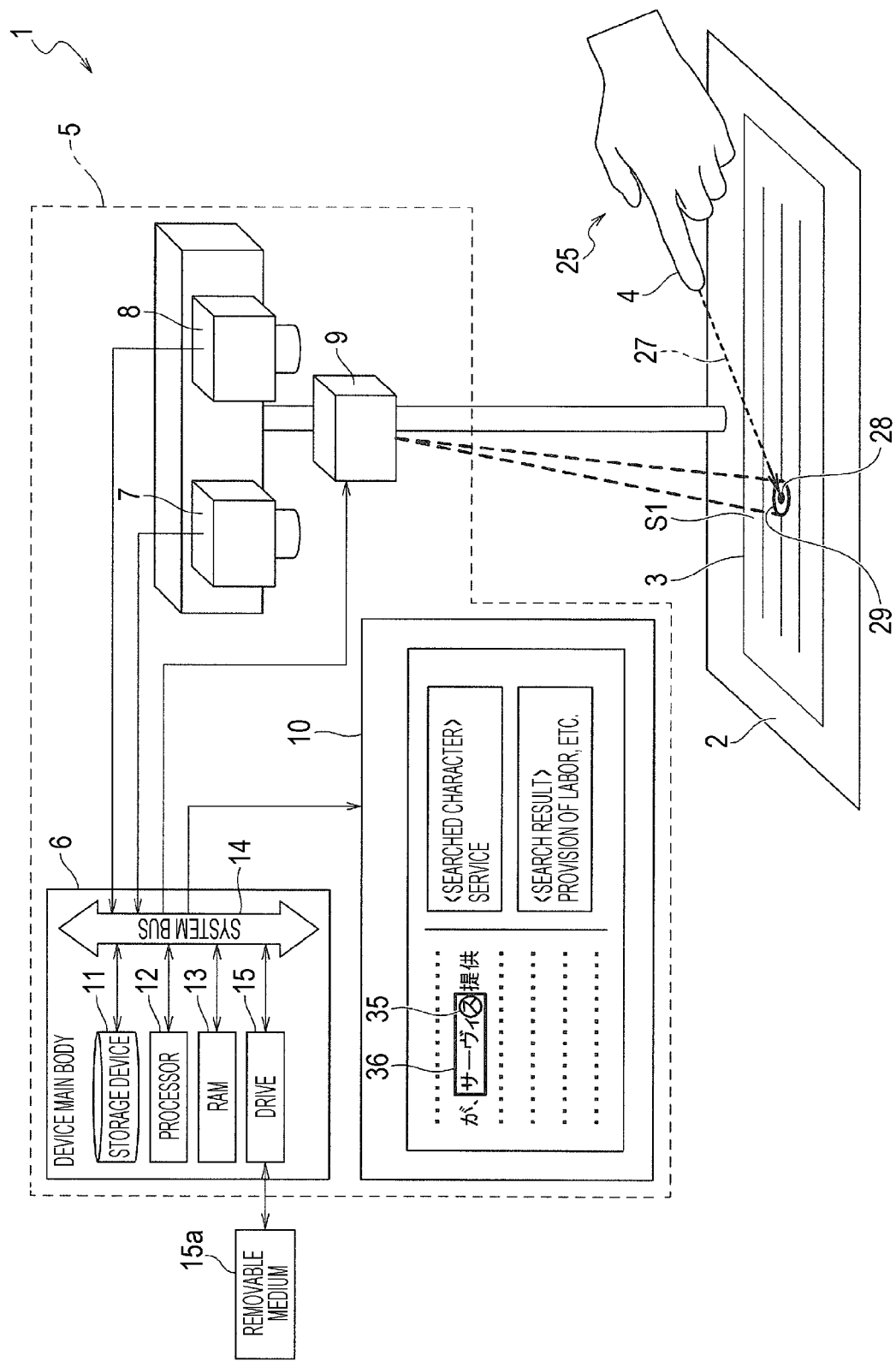
FIG. 1 is a diagram illustrating an overall configuration of an information processing apparatus according to a first embodiment.

Hereinafter, embodiments of an information processing apparatus and an information processing method of the present disclosure will be described with reference to the drawings.

However, the embodiments described below are merely examples, and are not intended to exclude various modifications and applications of techniques that are not explicitly described below. The present disclosure can be variously modified and implemented without departing from a gist thereof. For example, the embodiments may be implemented in combination.

Furthermore, in the following drawings, the same or similar portions are denoted by the same or similar reference numerals. Furthermore, the drawings are schematic, and do not necessarily coincide with actual dimensions, ratios, and the like. The drawings may include portions having different dimensional relationships and ratios.

Furthermore, effects described in the present specification are merely examples and are not limited, and there may be other effects.

The embodiments of the present disclosure will be described in the following order.

1. First Embodiment: Information Processing Apparatus and Information Processing Method
   1-1 Overall Configuration of Information Processing Apparatus
   1-2 Contents of Search Processing
   1-3 Contents of Display Processing
   1-4 Modifications
2. Second Embodiment: Information Processing Apparatus and Information Processing Method

1. First Embodiment

[1-1 Overall Configuration of Information Processing Apparatus]

FIG. 1 is a diagram illustrating an overall configuration of an information processing apparatus 1 according to a first embodiment. The information processing apparatus 1 in FIG. 1 is a computing device including a user interface 5 that allows a user to designate a position of a character and the like present on an upper surface S1 ("predetermined surface" in a broad sense) of an object 3 without contacting the upper surface S1 of the object 3 by pointing at the upper surface S1 of the object 3 placed on a reading region 2 by a target object 4 in a non-contact manner. The object 3 may be, for example, a book, a document, and the like, as long as a character, an image, and the like are displayed on the upper surface S1. Furthermore, the target object 4 may be, for example, a finger, a pen, a pointer, and the like, as long as the target object 4 can point to a desired position of the object 3. FIG. 1 illustrates a case where a document is employed as the object 3 and a finger is employed as the target object 4. In the first embodiment, a case where "finger 4" is used as "target object 4" will be described. By using the finger 4, the user can point to a desired position of the object 3 with the finger 4 to execute processing according to the pointed position.

As illustrated in FIG. 1, the information processing apparatus 1 includes the user interface 5 and a computing device main body (hereinafter, also referred to as "device main body 6"). The user interface 5 includes a distance measurement unit 7, an imaging unit 8, a projection unit 9, and a display unit 10.

The distance measurement unit 7 is a device that sequentially outputs a distance image indicating a distance to each object present within a predetermined range. The distance image is an image indicating a distance (depth value) to an object for each pixel, and is also called a depth image. FIG. 1 illustrates a case where the distance measurement unit 7 is disposed above the reading region 2 and generates a distance image indicating a distance between the upper surface S1 of the object 3 (document) placed in the reading region 2 and the target object 4 (finger 4) present above the object 3. As the distance measurement unit 7, for example, a time of flight (TOF) sensor that generates a distance image, and a stereo camera that captures two monochrome images with two cameras and generates a distance image from parallax between the captured two monochrome images can be adopted. FIG. 1 illustrates a case where the TOF sensor is employed as the distance measurement unit 7. Note that, in a case where the stereo camera is adopted, one of the two cameras constituting the stereo camera may function as the imaging unit 8. The generated distance image is output to the device main body 6.

Figure 5:
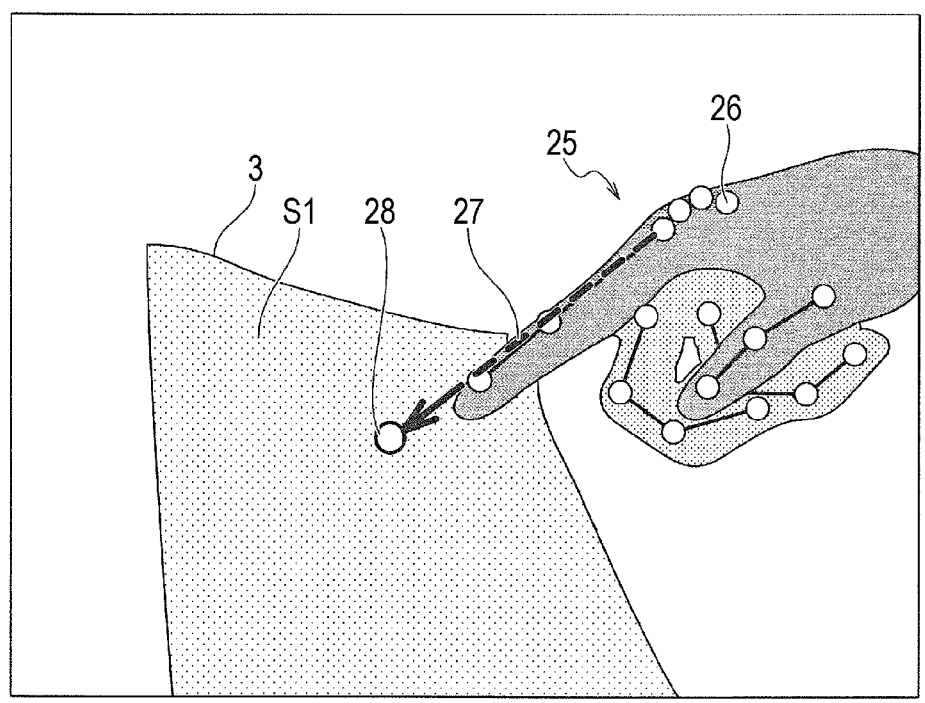
FIG. 5 is a diagram illustrating a method of calculating a position of a skeleton point of a hand based on a distance image.

Note that although FIG. 1 illustrates an example in which the distance measurement unit 7 is disposed vertically above the reading region 2, other configurations can be adopted. For example, as illustrated in FIG. 5, any position may be used as long as a distance image that can identify a position pointed by the finger 4 can be obtained, and arrangement may be made obliquely upward of the reading region 2.

The imaging unit 8 is a device that sequentially generates a captured image within a predetermined range in which a distance image is generated. FIG. 1 illustrates a case where the imaging unit 8 is disposed above the reading region 2 so as to be aligned with the distance measurement unit 7 and generates a captured image indicating the upper surface S1 of the object 3 (document) placed in the reading region 2 and the target object 4 (finger 4) present above the object 3. As the imaging unit 8, for example, a complementary metal oxide semiconductor (CMOS) camera or a charge coupled device (CCD) camera can be adopted. The generated captured image is output to the device main body 6.

The projection unit 9 is a device that projects various calculation results and the like by the device main body 6 onto the object 3 placed in the reading region 2. FIG. 1 exemplifies a case where the imaging unit 8 projects a predetermined image 29 onto a position, of the upper surface S1 of the object 3, pointed by the finger 4. For example, a circle can be used as the predetermined image 29. Furthermore, for example, a projector that projects the predetermined image 29 and a laser pointer capable of projecting laser light by changing an emission direction can be adopted as the projection unit 9. FIG. 1 illustrates a case where the laser pointer is employed as the projection unit 9.

The display unit 10 is a device that displays various calculation results and the like by the device main body 6. FIG. 1 illustrates a case where the imaging unit 8 displays an image in which a selection region and the like are superimposed on the captured image. Furthermore, a display, a projector, and AR goggles can be adopted as the display unit 10.

The device main body 6 includes hardware resources such as a storage device 11, a processor 12, a random access memory (RAM) 13, and the like. The storage device 11, the processor 12, and the RAM 13 are connected to each other by a system bus 14. Moreover, the distance measurement unit 7, the imaging unit 8, the projection unit 9, the display unit 10, and a drive 15 are connected to the system bus 14.

The storage device 11 is a secondary storage device including a hard disc drive (HDD), a solid state drive (SSD), and the like. The storage device 11 stores a program of the information processing apparatus 1 executable by the processor 12. Furthermore, various data necessary for executing the program are stored.

Figure 2:
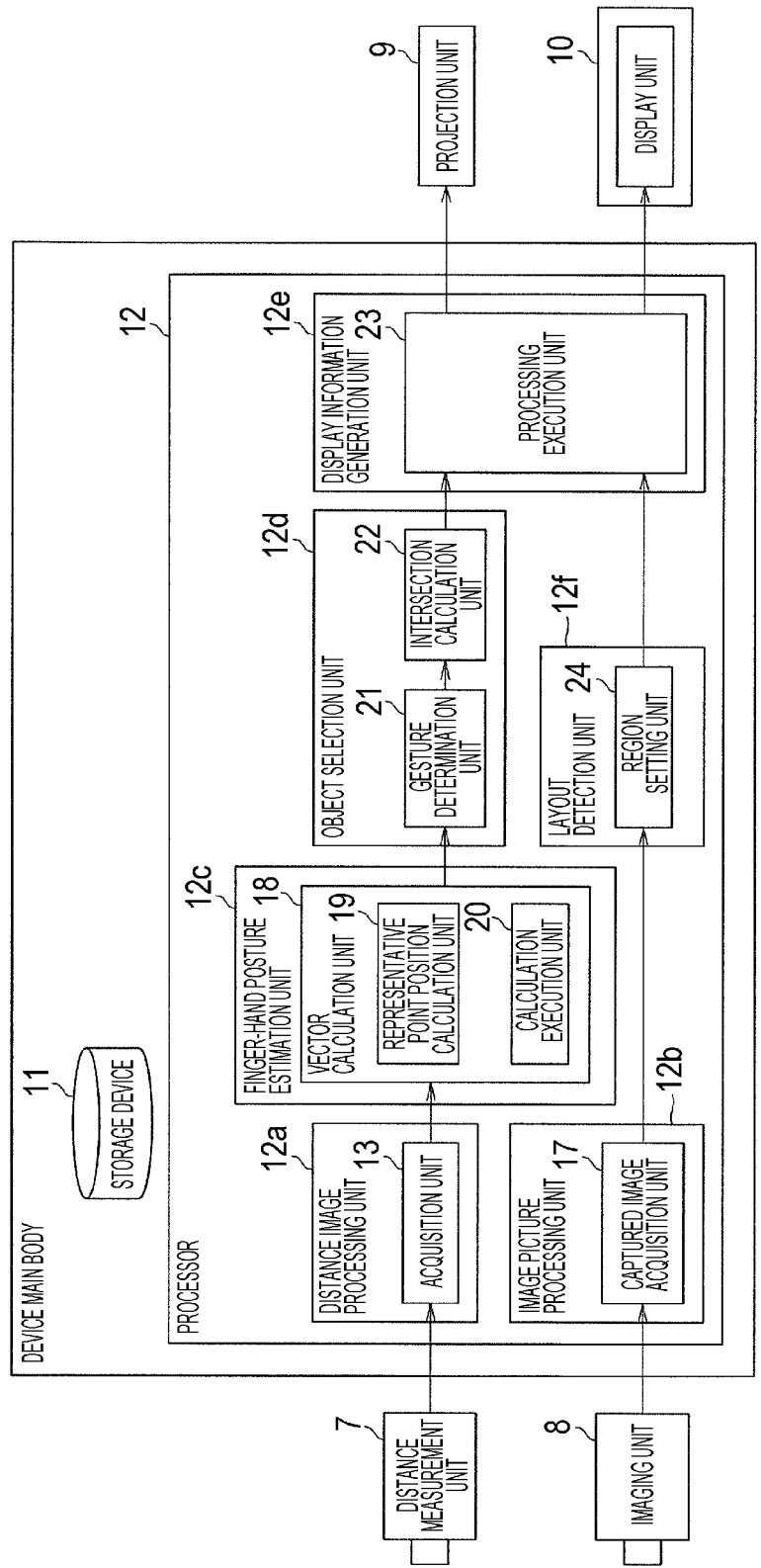
FIG. 2 is a diagram illustrating a functional configuration of a distance image processing unit and the like realized by a processor.

The processor 12 is various processors such as a central processing unit (CPU), an application specific integrated circuit (ASIC), a field-programmable gate array (FPGA), and the like. The processor 12 loads a program and the like stored in the storage device 11 into the RAM 13 and executes the program and the like, performs calculation of various processing, logical determination, and the like, and controls each configuration connected to the system bus 14. For example, the processor 12 implements a distance image processing unit 12*a*, an image picture processing unit 12*b*, a finger-hand posture estimation unit 12*c*, an object selection unit 12*d*, a display information generation unit 12*e*, and a layout detection unit 12*f* as illustrated in FIG. 2 according to the program stored in the storage device 11. The distance image processing unit 12*a* includes an acquisition unit 16. Hereinafter similarly, the image picture processing unit 12*b* includes a captured image acquisition unit 17, the finger-hand posture estimation unit 12*c* includes a vector calculation unit 18 (including a representative point position calculation unit 19 and a calculation execution unit 20), the object selection unit 12*d* includes a gesture determination unit 21 and an intersection calculation unit 22, the display information generation unit 12*e* includes a processing execution unit 23, and the layout detection unit 12*f* includes a region setting unit 24.

Then, by the acquisition unit 16, the vector calculation unit 18 (the representative point position calculation unit 19, the calculation execution unit 20), the gesture determination unit 21, the intersection calculation unit 22, the processing execution unit 23, and the region setting unit 24, and on the basis of outputs from the distance measurement unit 7 and the imaging unit 8, in a case where the user points at the upper surface S1 of the object 3 with the finger 4 (target object 4) in a non-contact manner, the processor 12 executes search processing of calculating a pointed position, executing processing (for example, information search) according to the calculated position, and causing the projection unit 9 and the display unit 10 to display an image. During the execution of the search processing, the user performs an operation of sequentially pointing the finger 4 (target object 4) to positions on both ends of a region in which a character and the like for which information search is performed is present (hereinafter, also referred to as "selection region") in a region of the upper surface S1 of the object 3.

Note that the program executed by the processor 12 (computer) is, for example, provided by being recorded in a removable medium 15*a*, which is a package medium including, for example, a magnetic disk (including a flexible disk), an optical disk (a compact disc-read only memory (CD-ROM), a digital versatile disc (DVD), and the like), a magneto-optical disk, a semiconductor memory, and the like. Alternatively, for example, the program is provided via a wired or wireless transmission medium such as a local area network, the Internet, or digital satellite broadcasting. Then, the program can be installed on the storage device 11 via the system bus 14 by mounting the removable medium 15*a* on the drive 15. Furthermore, the program can be received by a communication unit (not illustrated) via a wired or wireless transmission medium and installed in the storage device 11. Moreover, the program can be installed in the storage device 11 in advance.

[1-2 Contents of Search Processing]

Next, search processing executed by the acquisition unit 16, the vector calculation unit 18 (the representative point position calculation unit 19, the calculation execution unit 20), the gesture determination unit 21, the intersection calculation unit 22, the processing execution unit 23, and the region setting unit 24 will be described. The search processing is executed when the object 3 is placed in the reading region 2.

Figure 3:
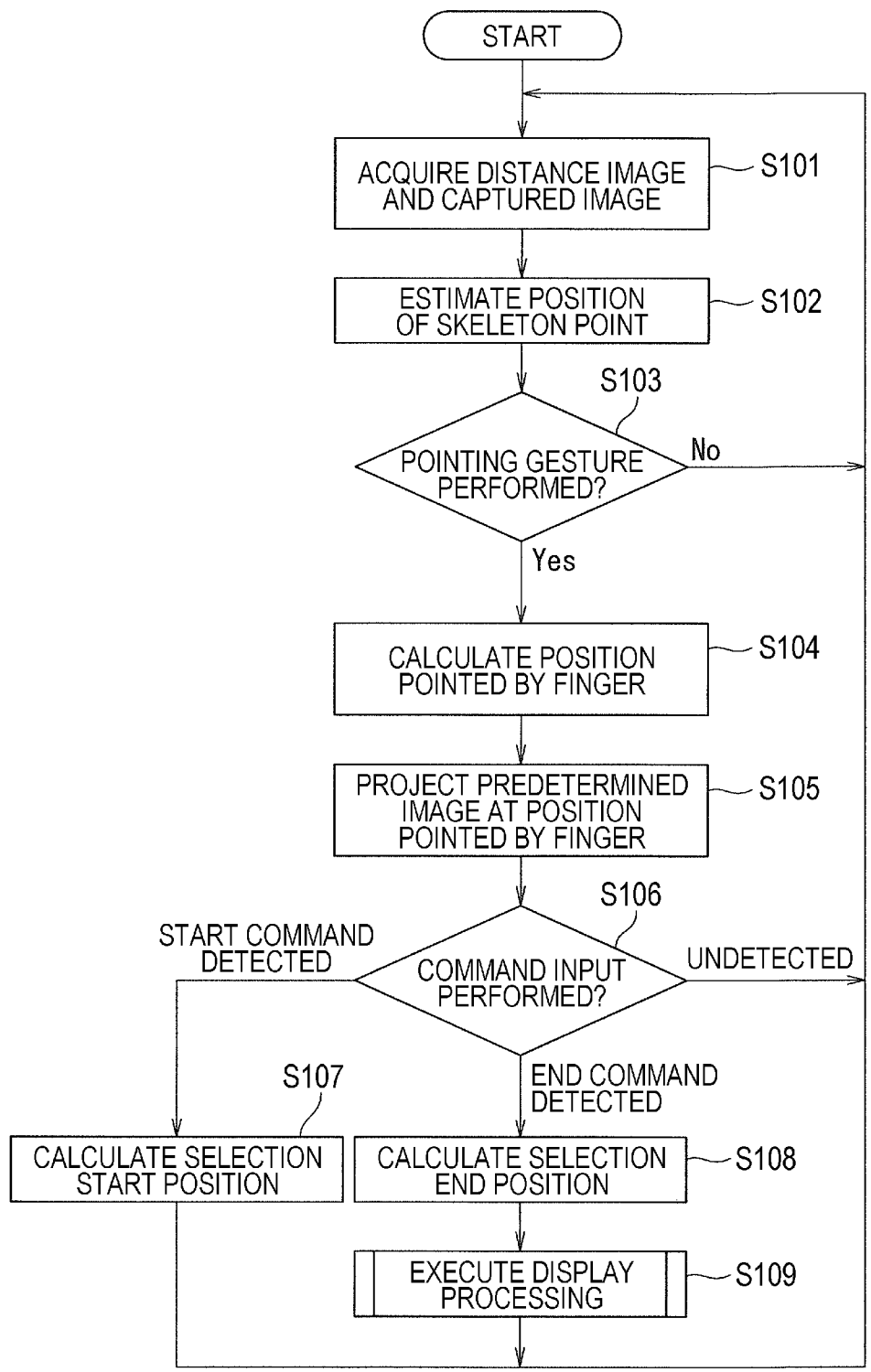
FIG. 3 is a diagram illustrating a flowchart of search processing.
Figure 4:
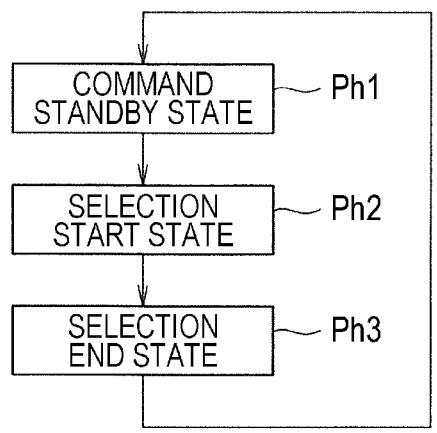
FIG. 4 is a diagram illustrating a state transition diagram of the information processing apparatus.

As illustrated in FIG. 3, first, the acquisition unit 16 acquires a distance image from the distance measurement unit 7 in step S101. At this time, in a case where it is immediately after a start of the search processing, or in a case where it is immediately after transition from step S109 to step S101 as described later, an operation state of the information processing apparatus 1 is shifted to a command standby state Ph1 for waiting for a user to point at a position of one end of a selection region, as illustrated in FIG. 4. Subsequently, the captured image acquisition unit 17 acquires a captured image from the imaging unit 8, and causes the display unit 10 to display the acquired captured image. Therefore, as illustrated in FIG. 1, the display unit 10 continuously displays the captured image of the upper surface S1 of the object 3 (document) placed in the reading region 2. FIG. 1 illustrates a case where a part of the captured image is enlarged and displayed on left half of the display unit 10.

Subsequently, the processing proceeds to step S102, and the representative point position calculation unit 19 calculates a position of a predetermined representative point (hereinafter, also referred to as "skeleton point 26") of a hand 25 on the basis of the distance image acquired in step S101, as illustrated in FIG. 5. As the skeleton point 26, for example, a fingertip, a joint (including a first joint and a third joint of an index finger), a central portion of a back of the hand 25, and a wrist bone can be adopted. As a method of calculating the skeleton point 26, for example, a method of estimating the position of the skeleton point 26 of the hand 25 on the basis of the distance image acquired in step S101 using a learning model learned by teacher data including a distance image of a hand and a position of the skeleton point 26 in the distance image can be adopted. According to the method using the learning model, the position of the skeleton point 26 can be estimated by inputting the distance image to the learning model, and the position of the skeleton point 26 can be easily estimated. Note that FIG. 5 illustrates a captured image in a case where the distance measurement unit 7 is disposed obliquely upward of the reading region 2.

Subsequently, the processing proceeds to step S103, and the gesture determination unit 21 determines whether the user performs a pointing gesture with the finger 4 on the basis of the position of the skeleton point 26 calculated in step S102. As the pointing gesture, for example, a hand gesture in which an index finger is extended and other fingers are bent can be adopted. As a method of determining the pointing gesture, for example, whether the user performs the pointing gesture is determined on the basis of the position of the skeleton point 26 calculated in step S102 using a learning model learned by teacher data including the position of the skeleton point 26 of the hand 25 and information indicating whether the position of the skeleton point 26 is a position of the skeleton point 26 at the time of the pointing gesture. According to the method using the learning model, whether the user performs the pointing gesture can be determined by inputting the estimated position of the skeleton point 26 of the hand 25, and the determination can be easily performed. Then, in a case where the gesture determination unit 21 determines that the pointing gesture is performed (Yes), the processing proceeds to step S104. On the other hand, in a case where it is determined that the pointing gesture is not performed (No), the processing returns to step S101.

Subsequently, the processing proceeds to step S104, and the calculation execution unit 20 calculates a vector 27 extending from the finger 4 in a direction pointed by the finger 4 on the basis of the positions of the skeleton points 26 calculated in step S102, as illustrated in FIG. 5. For example, a vector toward the upper surface S1 of the object 3 through a position of the skeleton point 26 on a wrist side and a position of the skeleton point 26 on a fingertip side among the calculated skeleton points 26 is calculated as the vector 27. FIG. 5 illustrates a case where a position of the third joint of the index finger is adopted as the position of the skeleton point 26 on the wrist side, and a position of the first joint of the index finger is adopted as the position of the skeleton point 26 on the fingertip side. In this manner, the positions of the skeleton points 26 of the hand 25 are calculated, and the vector 27 is calculated on the basis of the calculated positions of the skeleton points 26, so that the direction pointed by the finger 4 by the user can be more appropriately calculated. Furthermore, since the vector 27 is calculated only in a case where it is determined that the pointing gesture is performed, an amount of calculation can be reduced, and malfunctions can be suppressed.

Subsequently, the intersection calculation unit 22 calculates, on the basis of the distance image acquired in step S101, a position of an intersection 28 of the vector 27 calculated by the vector calculation unit 18 and the upper surface S1 of the object 3 (an object existing within the predetermined range where the distance image is generated; FIGS. 1 and 5 illustrate a case where a document is adopted as the object 3). Therefore, in a case where the user points at the upper surface S1 of the object 3 (document) with the finger 4 in a non-contact manner, the pointed position can be calculated as the intersection 28.

Subsequently, the processing proceeds to step S105, and the processing execution unit 23 controls the projection unit 9 so that the predetermined image 29 is projected at the position of the intersection 28 calculated in step S104. In other words, it can be said that the processing execution unit 23 executes processing according to the position of the intersection 28. For example, a circle can be used as the predetermined image 29. Therefore, the position pointed by the finger 4 can be fed back to the user, and the user can more reliably point to a desired position of the object 3 with the finger 4.

Figure 6:
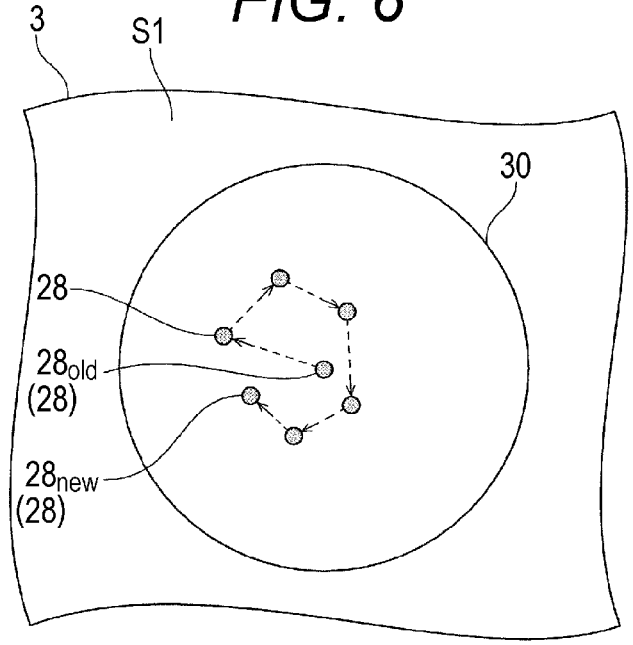
FIG. 6 is a diagram illustrating a method of determining whether there is a command input by a user.

Subsequently, the processing proceeds to step S106, and the processing execution unit 23 determines whether the user has performed command input. For example, as illustrated in FIG. 6, it is determined whether all the intersections 28 from the intersection 28 calculated a predetermined time (for example, one second) before (hereinafter, also referred to as "intersection 28 old") to the intersection 28 calculated immediately before (hereinafter, also referred to as "intersection 28 new") among the intersections 28 calculated in step S104 are located in a predetermined region 30, of the upper surface S1 of the object 3 (document), centered on the intersection 28 old calculated the predetermined time (one second) before. As the predetermined region 30, for example, a circular region centered on the intersection 28 old calculated the predetermined time before can be adopted. Then, in a case where the processing execution unit 23 determines that some of the intersections 28 from the intersection 28 old to the intersection 28 new are not located in the predetermined region 30, it is determined that the command input has not been performed (undetected), and the process returns to step S101. Therefore, when the user performs a pointing gesture and the position pointed by the finger 4 is changed, a flow of steps S101 to S106 is repeated.

On the other hand, in a case where the processing execution unit 23 determines that all the intersections 28 of the intersections 28 are located within the predetermined region 30, it is determined whether the information processing apparatus 1 is in the command standby state Ph1. Then, in a case where it is determined to be in the command standby state Ph1, it is determined that a start command has been performed as the command input (start command detected), and the process proceeds to step S107. On the other hand, in a case where it is determined not to be in the command standby state Ph1, it is determined that an end command has been performed as the command input (end command detected), and the process proceeds to step S108. Therefore, when the finger 4 continues to point at the same position, the processing exits repetition of the flow of steps S101 to S106, and proceeds to step S107 or S108.

In step S107, the processing execution unit 23 calculates a position of one end of the selection region (selection start position), and then returns to step S101. For example, a position of a representative point of the plurality of intersections 28 calculated by repeating the flow of steps S101 to S106 a plurality of times (hereinafter, also referred to as "first position") on the upper surface S1 of the object 3 (document) is calculated. Specifically, the first position may be calculated on the basis of all the intersections 28 from the intersection 28 old to the intersection 28 new among the plurality of calculated intersections 28. As a method of calculating the first position, for example, a method of calculating an average of coordinate values of all the intersections 28 from the intersection 28 old to the intersection 28 new can be adopted. Therefore, the user can set the first position indicating one end of the selection region by continuously pointing at the upper surface S1 of the object 3 (document) with the finger 4 in a non-contact manner for a predetermined time (one second) while performing the pointing gesture. Subsequently, the processing execution unit 23 controls the display unit 10 so that an image indicating one end of the selection region is displayed in superposition with the captured image displayed in step S101 at a position in the captured image corresponding to the first position. Furthermore, in step S107, as illustrated in FIG. 4, the operation state of the information processing apparatus 1 is shifted to a selection start state Ph2 for waiting for pointing at a position of another end of the selection region.

On the other hand, in step S108, the processing execution unit 23 calculates the position of the other end of the selection region (selection end position). For example, a position of a representative point of the plurality of intersections 28 calculated after the state transitions to the selection start state Ph2 (hereinafter, also referred to as "second position") on the upper surface S1 of the object 3 (document) is calculated. Specifically, the second position may be calculated on the basis of all the intersections 28 from the intersection 28 old to the intersection 28 new among the plurality of calculated intersections 28. As a method of calculating the second position, for example, a method of calculating an average of coordinate values of all the intersections 28 from the intersection 28 old to the intersection 28 new can be adopted. Therefore, the user can set the second position indicating the other end of the selection region by performing the pointing gesture again after setting the first position, and continuously pointing at the upper surface S1 of the object 3 (document) with the finger 4 in a non-contact manner for a predetermined time (one second) while performing the pointing gesture. Subsequently, the processing execution unit 23 controls the display unit 10 so that an image indicating the other end of the selection region is displayed in superposition with the captured image displayed in step S101 at a position in the captured image corresponding to the second position. Furthermore, in step S108, as illustrated in FIG. 4, the operation state of the information processing apparatus 1 is shifted to a selection end state Ph3 in which an end of processing performed on a character and the like existing in the selection region is waited and user's input is not accepted until the processing ends.

Subsequently, the processing proceeds to step S109 where the region setting unit 24 and the processing execution unit 23 specify a region in the captured image corresponding to the first position calculated in step S107 and the second position calculated in step S108, execute predetermined processing (for example, OCR processing) on the specified region, and execute display processing of displaying a processing result on the display unit 10. Then, the processing returns to step S101.

[1-3 Contents of Display Processing]

Next, display processing executed by the region setting unit 24 and the processing execution unit 23 will be described.

Figure 7:
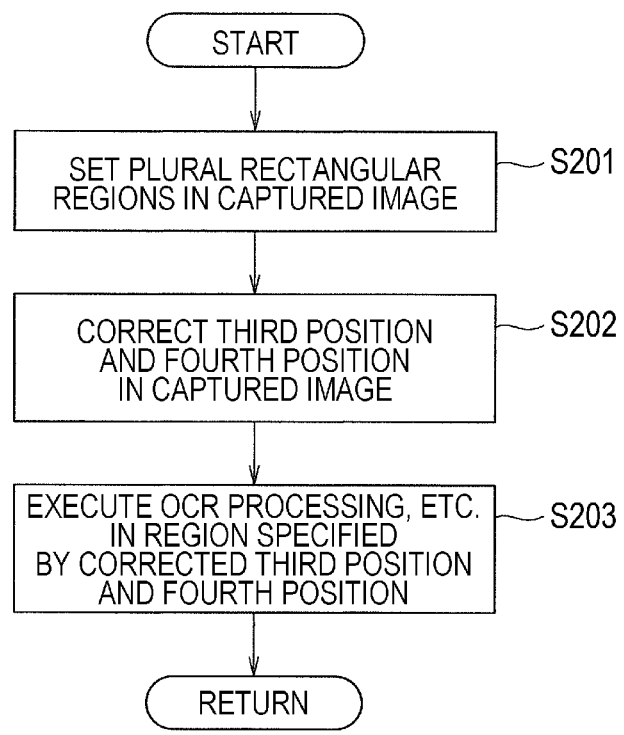
FIG. 7 is a diagram illustrating a flowchart of display processing.
Figure 8:
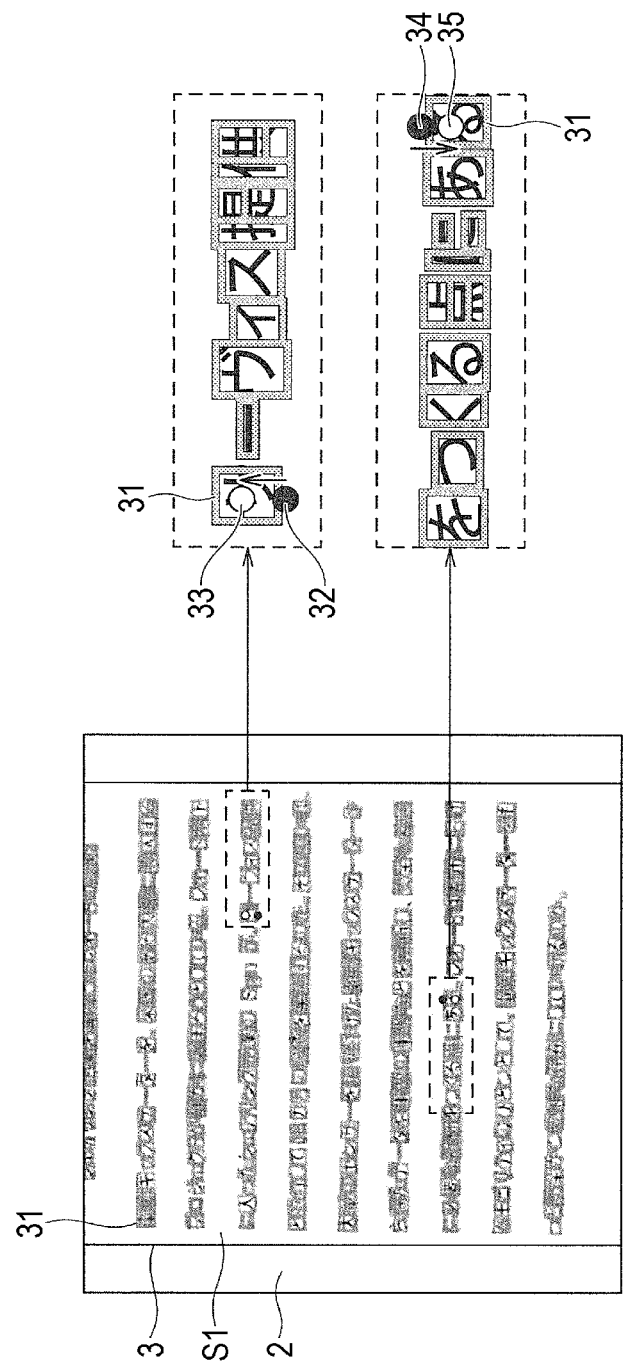
FIG. 8 is a diagram illustrating a method of correcting a third position and a fourth position in a captured image.

As illustrated in FIG. 7, first, in step S201, the region setting unit 24 sets a plurality of rectangular regions 31 each including at least a part of a character in the captured image acquired in step S101, as illustrated in FIG. 8. As the rectangular region 31, for example, maximally stable extremal regions (MSER) that combine pixels having similar luminance values into one region can be adopted.

Subsequently, the processing proceeds to step S202, and the processing execution unit 23 calculates a position in the captured image corresponding to the first position calculated in step S107 (hereinafter, also referred to as "third position 32"). For example, after a pixel in the distance image corresponding to the first position is calculated, calibration is performed by edge detection of the object 3 (document) on the distance image and the captured image, correspondence between each pixel of the object 3 (document) in the distance image and each pixel of the object 3 (document) in the captured image is analyzed, and the pixel in the captured image corresponding to the calculated pixel in the distance image is calculated on the basis of an analysis result to obtain the third position 32. Subsequently, the processing execution unit 23 corrects the calculated third position 32 to a center position of the rectangular region 31 to which the third position 32 belongs. Hereinafter, the corrected third position 32 is also referred to as "corrected third position 33". Subsequently, the processing execution unit 23 controls the display unit 10 so that an image indicating the corrected third position 33 is displayed in superposition with the captured image displayed in step S101.

Subsequently, the processing execution unit 23 calculates a position in the captured image corresponding to the second position calculated in step S108 (hereinafter, also referred to as "fourth position 34"). For example, similarly to the method for calculating the third position 32, after a pixel in the distance image corresponding to the second position is calculated, calibration is performed by edge detection of the object 3 (document) on the distance image and the captured image, correspondence between each pixel of the object 3 (document) in the distance image and each pixel of the object 3 (document) in the captured image is analyzed, and the pixel in the captured image corresponding to the calculated pixel in the distance image is calculated on the basis of an analysis result to obtain the fourth position 34. Subsequently, the processing execution unit 23 corrects the calculated fourth position 34 to a center position of the rectangular region 31 to which the fourth position 34 belongs. Therefore, for example, in a case where a space between characters is erroneously designated or in a case where a space between lines is erroneously designated, the third position 32 and the fourth position 34 can be corrected in the rectangular region 31 including at least a part of the character. Hereinafter, the corrected fourth position 34 is also referred to as "corrected fourth position 35". Subsequently, the processing execution unit 23 controls the display unit 10 so that an image indicating the corrected fourth position 35 is displayed in superposition with the captured image displayed in step S101.

Figure 9:
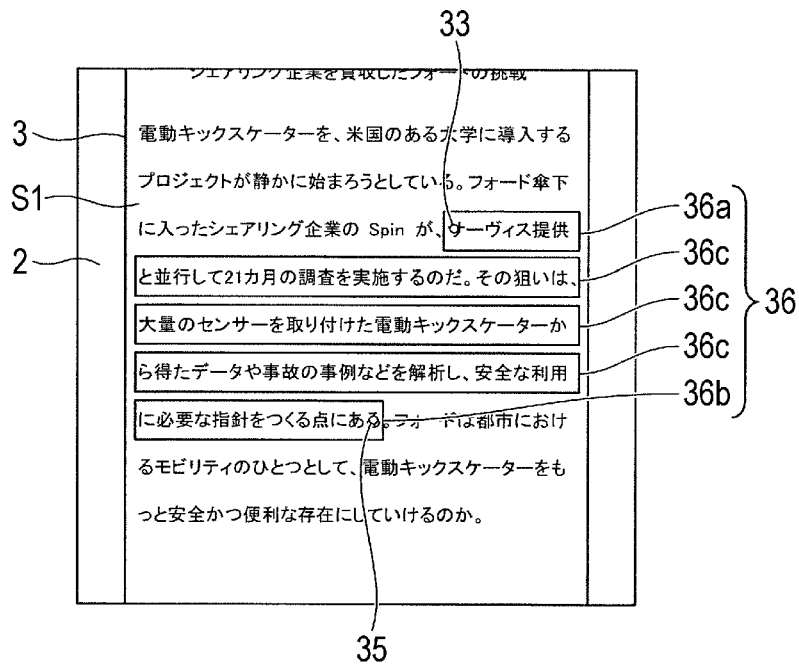
FIG. 9 is a diagram illustrating a method of specifying a region based on the corrected third position and fourth position.
Figure 10:
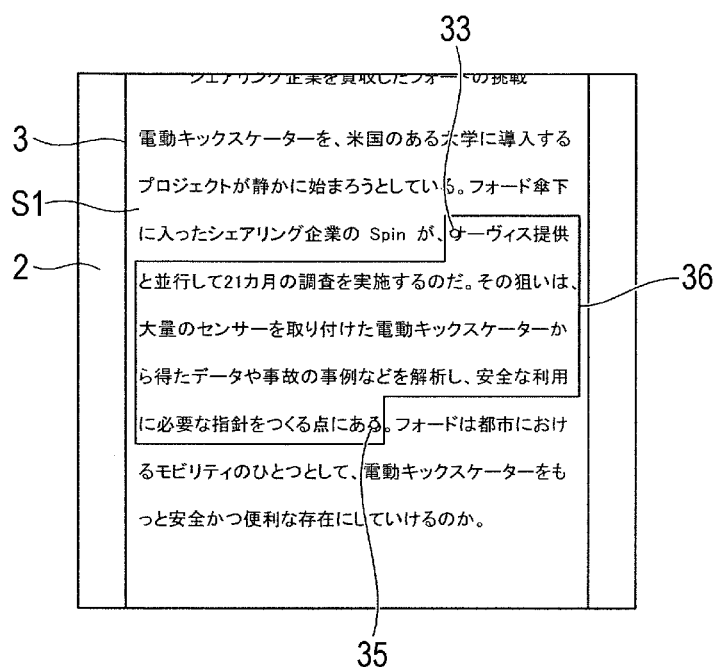
FIG. 10 is a diagram illustrating a method of specifying a region based on the corrected third position and fourth position.

Subsequently, the processing proceeds to step S203, and as illustrated in FIGS. 9 and 10, the processing execution unit 23 specifies a region 36 including a plurality of characters from a character present at the corrected third position 33 to a character present at the corrected fourth position 35 obtained in step S202, and searches for information regarding a character included in the specified region 36. In other words, it can be said that the processing execution unit 23 executes predetermined processing on the region 36 in the captured image specified by the corrected third position 33 and fourth position 35. FIG. 9 illustrates a case where a band-shaped region 36a including the character present at the corrected third position 33 and extending rightward, a band-shaped region 36b including the character present at the corrected fourth position 35 and extending leftward, and a plurality of band-shaped regions 36c corresponding to lines of characters present between the band-shaped regions 36a and 36b are collectively defined as the region 36. Furthermore, FIG. 10 illustrates a case where one region obtained by connecting the band-shaped regions 36a, 36b, and 36c of FIG. 9 is set as the region 36. Subsequently, as illustrated in FIG. 1, the processing execution unit 23 controls the display unit 10 such that an image indicating the region 36 is displayed in superposition with the captured image displayed in step S101.

As a method of searching for the information regarding the character included in the region 36, for example, a method of executing optical character recognition (OCR) processing that recognizes the character included in the specified region 36 and search processing that searches for information regarding the character recognized in the OCR processing can be adopted. Furthermore, for example, a web page including the character and a meaning of the character can be adopted as the information regarding the character. Subsequently, as illustrated in FIG. 1, the processing execution unit 23 causes the display unit 10 to display a search result, then terminates the display processing, and returns to step S101 of the search processing. In other words, it can be said that the processing execution unit 23 causes the display unit 10 to display the processing result by the processing execution unit 23. FIG. 1 illustrates a case where the search result is displayed on right half of the display unit 10. By displaying the search result on the display unit 10, it is possible to notify the user of the information regarding the character.

As described above, in the information processing apparatus 1 according to the first embodiment, the vector calculation unit 18 calculates the vector 27 extending from the target object 4 (finger 4) in the direction indicated by the target object 4 (finger 4) on the basis of the acquired distance image. Subsequently, the intersection calculation unit 22 calculates the position of the intersection 28 of the upper surface S1 (predetermined surface) of the object 3 (document) and the calculated vector 27 on the basis of the acquired distance image. Subsequently, the processing execution unit 23 executes processing corresponding to the calculated position of the intersection 28. Therefore, in a case where the user points at the upper surface S1 of the object 3 (document) with the target object 4 (finger 4) in a non-contact manner, the pointed position can be calculated as the intersection 28. Therefore, for example, unlike the method in which the user touches the predetermined surface with the target object 4 (finger 4), the upper surface S1 (predetermined surface) of the object 3 (document) and the target object can be prevented from being assimilated in the distance image, and recognition accuracy of the target object 4 (finger 4) can be improved. Therefore, it is possible to provide the information processing apparatus 1 capable of improving detection accuracy of a position pointed by the target object 4 (finger 4).

Here, as a method of recognizing a character and the like existing on the upper surface S1 (predetermined surface) of the object 3 (document), for example, there is a method of causing a user to touch a character and the like with the target object 4 (finger 4) and recognizing the character and the like existing at a touch position from a captured image captured by the imaging unit 8 above the object 3 (document). However, in such a method, the character and the like are hidden by the target object 4 (finger 4), the character and the like are not shown in the captured image, and there is a possibility that recognition accuracy of the character and the like is deteriorated.

On the other hand, in the information processing apparatus 1 according to the first embodiment, in a case where the processing execution unit 23 determines that all the intersections 28 from the intersection 28 old calculated a predetermined time (one second) before to the intersection 28 new calculated immediately before among the calculated intersections 28 are located within the predetermined region 30, of the upper surface S1 (predetermined surface) of the object 3, centered on the intersection 28 old calculated the predetermined time (one second) before, the position (first position) of the representative point of all the intersections 28 is calculated. Subsequently, after a lapse of a predetermined time (one second) or more from calculation of the first position, in a case where it is determined that all the intersections 28 from the intersection 28 old calculated the predetermined time (one second) before to the intersection 28 new calculated immediately before are located in the region, of the upper surface S1 (predetermined surface) of the object 3, centered on the intersection 28 old calculated the predetermined time (one second) before, the position (second position) of the representative point of all the intersections 28 is calculated. Subsequently, OCR processing of recognizing a character and search processing of searching for information regarding the character recognized by the OCR processing are executed in the region 36 in the captured image corresponding to the calculated first position and second position. Therefore, it is possible to prevent a character and the like from being hidden by the target object 4 (finger 4), to acquire a more appropriate captured image, and to improve recognition accuracy of the character and the like.

Furthermore, as another method of recognizing a character and the like present on the upper surface S1 (predetermined surface) of the object 3 (document), for example, there is a method of causing a user to trace a character and the like with a pen-type scanner dictionary and recognizing the character and the like present at a traced position with the pen-type scanner dictionary. However, in such a method, it is necessary to trace the character and the like with a button of the pen-type scanner dictionary, which takes time and effort. In particular, in a case where a character and the like extends over a plurality of lines, it is necessary to trace each line in order, and it is necessary to perform an ON/OFF operation of a scan button at the time of moving to a line, which takes much time and effort.

Furthermore, as another method of recognizing a character and the like existing on the upper surface S1 (predetermined surface) of the object 3 (document), for example, there is a method of causing a document scanner connected to a personal computer to scan the entire upper surface S1 (predetermined surface) of the object 3 (document), causing the personal computer to perform OCR processing on an entire image obtained by the scanning to recognize the character, causing a user to select an arbitrary character among a recognition result by operating the personal computer, and searching for information regarding the selected character using the personal computer. However, in such a method, it is necessary to perform the OCR processing on the entire image obtained by the scanning, to select the character for which information is desired to be obtained from the character obtained by the OCR processing, and to perform the search operation for the information regarding the selected character, which takes time and effort. In particular, in a case where there are many characters in the captured image, it takes much time and effort.

On the other hand, in the information processing apparatus 1 according to the first embodiment, the target object 4 (the finger 4) sequentially points at the positions of both ends of the region (selection region) where the character and the like desired to be subjected to the information search are present, so that the information regarding the character can be searched and time and effort required for the information search can be reduced.

[1-4 Modifications]

(1) In the first embodiment, an example has been described in which both the projection unit 9 and the display unit 10 are provided, the projection unit 9 is caused to project the predetermined image 29 at the position of the intersection 28, and the display unit 10 is caused to display the captured image, the region 36 in the captured image, and the processing result by the processing execution unit 23. However, other configurations can be adopted. For example, the projection unit 9 may be configured to perform at least one of projection of the predetermined image 29 at the position of the intersection 28, projection of the region 36, or projection of the processing result by the processing execution unit 23. Furthermore, for example, the display unit 10 may be configured to perform at least one of display of the captured image, display of the predetermined image 29 at the position corresponding to the intersection 28 in the captured image, display of the region 36 in the captured image, or display of the processing result by the processing execution unit 23.

(2) Furthermore, in the first embodiment, an example has been described in which the object 3 is placed in the reading region 2, and the upper surface S1 of the object 3 is set as "predetermined surface" and is pointed by the target object 4 in a non-contact manner. However, another configuration can be adopted. For example, a surface on which the reading region 2 is formed may be set as "predetermined surface", an image forming a user interface may be projected on the reading region 2 by a projector and the like, and the projected image (for example, an image of a switch) may be pointed by the target object 4 in a non-contact manner.

2. Second Embodiment

Figure 11:
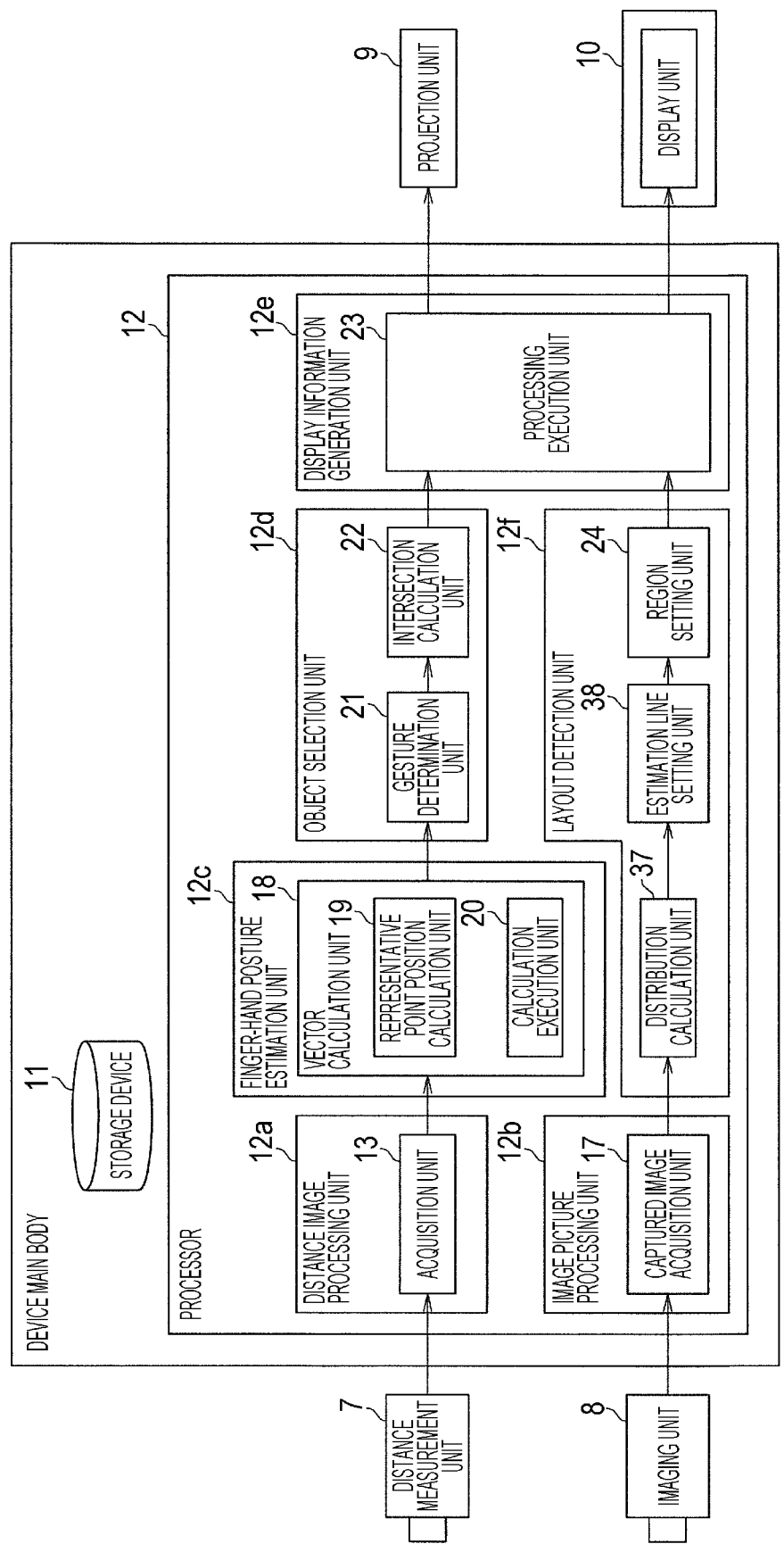
FIG. 11 is a diagram illustrating a functional configuration of a distance image processing unit and the like realized by a processor of an information processing apparatus according to a second embodiment.
Figure 12:
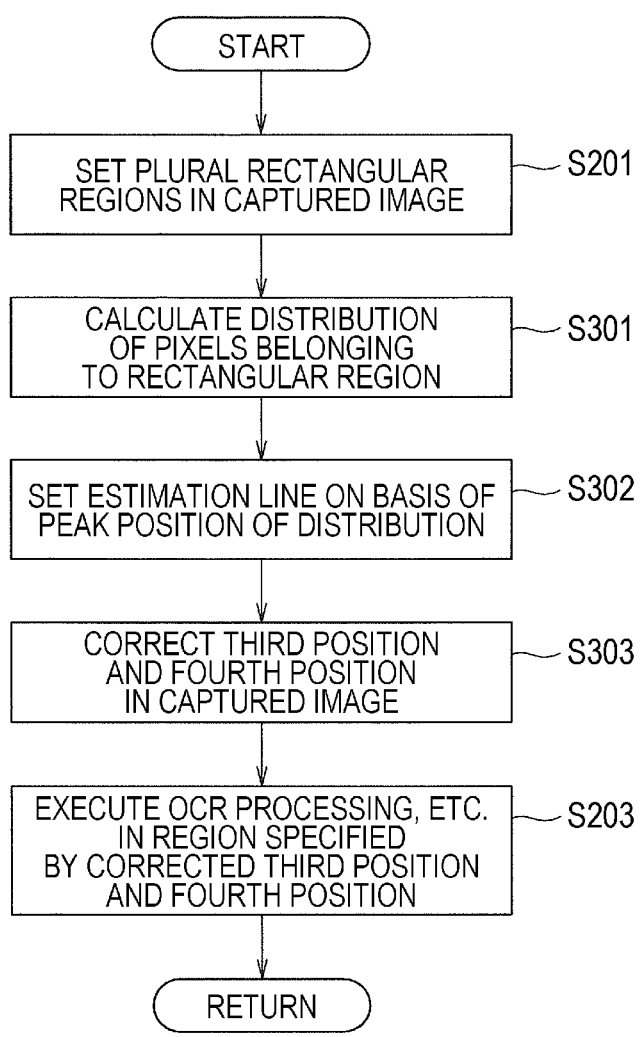
FIG. 12 is a diagram illustrating a flowchart of display processing.

Next, an information processing apparatus 1 according to a second embodiment will be described. The information processing apparatus 1 according to the second embodiment is obtained by changing a part of the configuration of the information processing apparatus 1 according to the first embodiment. An overall configuration of the information processing apparatus 1 according to the second embodiment is similar to that in FIG. 1, and thus illustration thereof is omitted. FIG. 11 is a diagram illustrating the acquisition unit 16 and the like implemented by the processor 12 of the information processing apparatus 1 according to the second embodiment. FIG. 12 is a diagram illustrating a flowchart of display processing. In FIGS. 11 and 12, portions corresponding to those in FIGS. 2 and 7 are denoted by the same reference numerals, and redundant description is omitted.

The information processing apparatus 1 according to the second embodiment is different from that of the first embodiment in a method of correcting the third position 32 and the fourth position 34 in a captured image. Specifically, the processor 12 implements a distribution calculation unit 37 and an estimation line setting unit 38 illustrated in FIG. 11 in addition to the acquisition unit 16, the captured image acquisition unit 17, the vector calculation unit 18 (the representative point position calculation unit 19, the calculation execution unit 20), the gesture determination unit 21, the intersection calculation unit 22, the processing execution unit 23, and the region setting unit 24. Furthermore, the processing execution unit 23, the distribution calculation unit 37, and the estimation line setting unit 38 execute the display processing (steps S201, S301, S302, S303 and S203) illustrated in FIG. 12.

Figure 13:
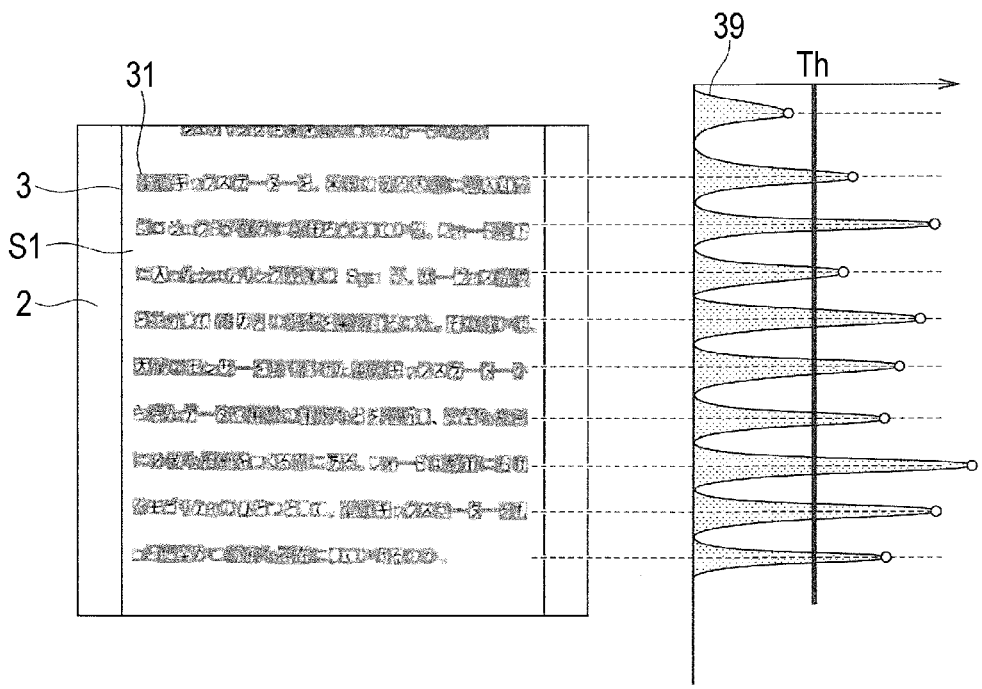
FIG. 13 is a diagram illustrating a distribution of pixels belonging to a rectangular region set in a captured image.

In step S301, as illustrated in FIG. 13, the distribution calculation unit 37 calculates a distribution 39 of the sum of the number of pixels belonging to the rectangular region 31 set in step S201 among pixels of the captured image arranged in a writing direction for each position in a direction perpendicular to the writing direction of the characters in the captured image acquired in step S101. FIG. 13 illustrates a case where the writing direction is a lateral direction.

Figure 14:
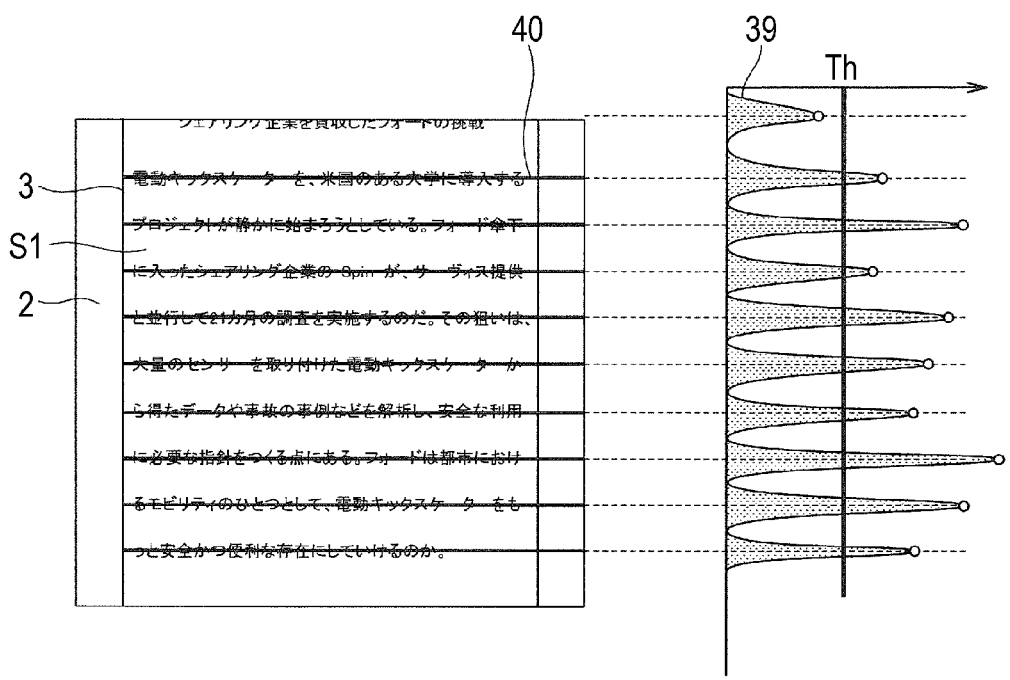
FIG. 14 is a diagram illustrating a method of setting an estimation line based on a peak position of the distribution.

Subsequently, the process proceeds to step S302, and as illustrated in FIG. 14, the estimation line setting unit 38 sets a straight line extending in the writing direction (hereinafter, also referred to as "estimation line 40") at a position where the distribution 39 calculated in step S301 takes a peak value and the peak value is equal to or greater than a predetermined threshold Th among positions in the direction perpendicular to the writing direction. Therefore, for example, in a case where the writing direction is the lateral direction, the estimation line 40 passing through an intermediate position in a character height direction can be set in each line.

Figure 15:
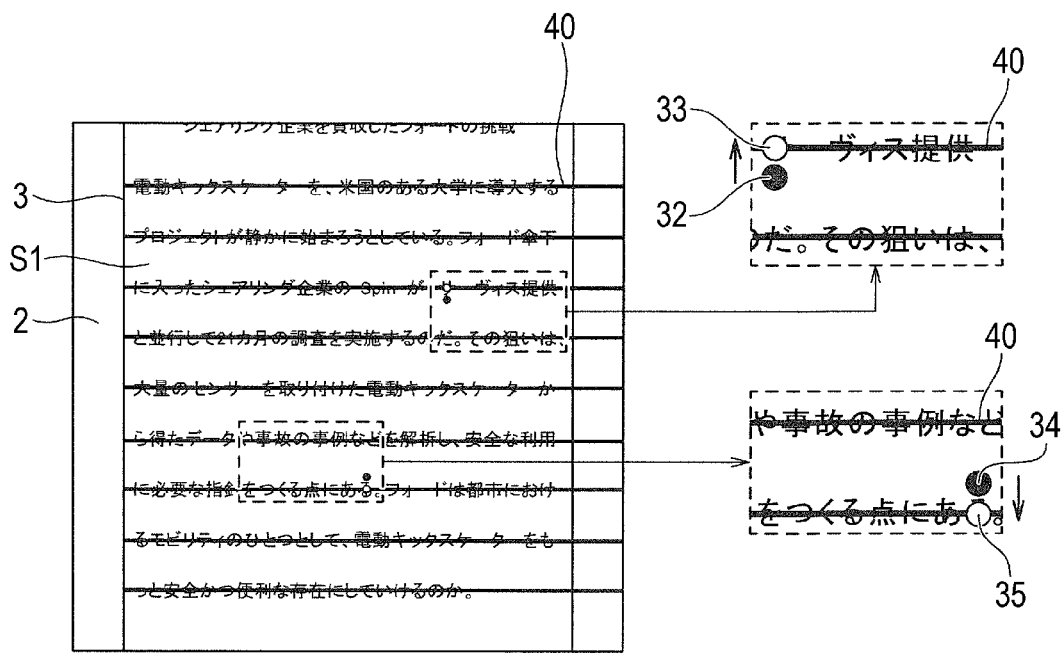
FIG. 15 is a diagram illustrating a method of correcting a third position and a fourth position in the captured image.

Subsequently, the processing proceeds to step S303, and as illustrated in FIG. 15, the processing execution unit 23 calculates a position (third position 32) in the captured image corresponding to the first position calculated in step S107, and corrects the calculated third position 32 to a position on the estimation line 40 closest to the third position 32. Subsequently, a position (fourth position 34) in the captured image corresponding to the second position calculated in step S108 is calculated, and the calculated fourth position 34 is corrected to a position on the estimation line 40 closest to the fourth position 34. Therefore, for example, in a case where the writing direction is the lateral direction, the third position 32 and the fourth position 34 can be corrected to the intermediate positions in the character height direction in a case where line spacing is erroneously designated.

Furthermore, the present disclosure may include the following technical matters.

(1)

An information processing apparatus including:

an acquisition unit that acquires a distance image indicating a distance to each object present within a predetermined range;

a vector calculation unit that calculates a vector extending from a target object present within the predetermined range in a direction pointed by the target object on the basis of the distance image acquired by the acquisition unit;

an intersection calculation unit that calculates a position of an intersection of a predetermined surface present within the predetermined range and the vector calculated by the vector calculation unit on the basis of the distance image acquired by the acquisition unit; and a processing execution unit that executes processing according to the position of the intersection calculated by the intersection calculation unit.

(2)

The information processing apparatus according to claim 1, in which
the target object is a finger.

(3)

The information processing apparatus according to (2), in which
the vector calculation unit includes
a representative point position calculation unit that calculates a position of a predetermined representative point of a hand on the basis of the distance image acquired by the acquisition unit, and
a calculation execution unit that calculates the vector on the basis of the position of the representative point calculated by the representative point position calculation unit.

(4)

The information processing apparatus according to (3), in which
the representative point position calculation unit estimates the position of the representative point of the hand on the basis of the distance image acquired by the acquisition unit by using a learning model learned by teacher data including a distance image of the hand and a position of the representative point in the distance image.

(5)

The information processing apparatus according to (4), in which
the vector calculation unit calculates a vector toward the predetermined surface through a position of the representative point on a wrist side and a position of the representative point on a fingertip side among the representative points calculated by the representative point position calculation unit.

(6)

The information processing apparatus according to (4) or (5), further including
a gesture determination unit that determines whether a user performs a pointing gesture with a finger on the basis of the position of the representative point calculated by the representative point position calculation unit, in which in a case where it is determined that the pointing gesture is performed, the vector calculation unit calculates the vector on the basis of the position of the representative point calculated by the representative point position calculation unit.

(7)

The information processing apparatus according to (6), in which the gesture determination unit determines whether the user performs the pointing gesture on the basis of the position of the representative point calculated by the representative point position calculation unit by using a learning model learned by teacher data including the position of the representative point of the hand and information indicating whether the position of the representative point is a position of the representative point at the time of the pointing gesture.

(8)

The information processing apparatus according to any one of (1) to (7), further including a captured image acquisition unit that acquires a captured image in a predetermined range in which the distance image is generated, in which the processing execution unit calculates a first position that is a position of a representative point of all intersections in a case where it is determined that all the intersections from an intersection calculated a predetermined time before to an intersection calculated immediately before among the intersections calculated by the intersection calculation unit are located in a region, of the predetermined surface, centered on the intersection calculated the predetermined time before, calculates a second position that is a position of a representative point of all intersections in a case where it is determined that all the intersections from the intersection calculated the predetermined time before to the intersection calculated immediately before after a lapse of the predetermined time or more from calculation of the first position are located in the region, of the predetermined surface, centered on the intersection calculated the predetermined time before, and executes predetermined processing on a region in the captured image corresponding to the calculated first position and second position.

(9)

The information processing apparatus according to (8), further including a region setting unit that sets a plurality of rectangular regions each including at least a part of a character in the captured image, in which the processing execution unit calculates a third position that is a position in the captured image corresponding to the first position, corrects the calculated third position to a center position of the rectangular region to which the third position belongs, calculates a fourth position that is a position in the captured image corresponding to the second position, corrects the calculated fourth position to a center position of the rectangular region to which the fourth position belongs, and performs the predetermined processing on a region in the captured image specified by the corrected third position and fourth position.

(10)

The information processing apparatus according to (8), further including:

a region setting unit that sets a plurality of rectangular regions each including at least a part of a character in the captured image;

a distribution calculation unit that calculates, for each position in a direction perpendicular to a writing direction of the characters, a distribution of the sum of the number of pixels belonging to the rectangular region among pixels of the captured image arranged in the writing direction; and an estimation line setting unit that sets an estimation line, which is a straight line extending in the writing direction, at a position where the distribution calculated by the distribution calculation unit takes a peak value and the peak value is a predetermined threshold or more among the positions in the direction perpendicular to the writing direction, in which the processing execution unit calculates a third position that is a position in the captured image corresponding to the first position, corrects the calculated third position to a position on the estimation line closest to the third position, calculates a fourth position that is a position in the captured image corresponding to the second position, corrects the calculated fourth position to a position on the estimation line closest to the fourth position, and performs the predetermined processing on a region in the captured image specified by the corrected third position and fourth position.

(11)

The information processing apparatus according to claim 9 or 10, in which the predetermined processing is processing including optical character recognition (OCR) processing of recognizing the character and search processing of searching for information regarding the character recognized by the OCR processing.

(12)

The information processing apparatus according to any one of (1) to (11), in which the processing execution unit controls a projection unit such that a predetermined image is projected at the position of the intersection calculated by the intersection calculation unit.

(13)

The information processing apparatus according to any one of (1) to (12), in which the processing execution unit causes a display unit to display a processing result by the processing execution unit.

(14)

An information processing method including:

acquiring a distance image indicating a distance to each object present within a predetermined range;

calculating a vector extending from a target object present within the predetermined range in a direction pointed by the target object on the basis of the acquired distance image;

calculating a position of an intersection of a predetermined surface present within the predetermined range and the vector calculated by the vector calculation unit on the basis of the acquired distance image; and executing processing according to the calculated position of the intersection.

REFERENCE SIGNS LIST

1 Information processing apparatus
2 Reading region (document)

3 Object
4 Target object (finger)
5 User interface
6 Device main body
7 Distance measurement unit
8 Imaging unit
9 Projection unit
10 Display unit
11 Storage device
12 Processor
12a Distance image processing unit
12b Image picture processing unit
12c Finger-hand posture estimation unit
12d Object selection unit
12e Display information generation unit
12f Layout detection unit
13 RAM
14 ROM
15 System bus
16 Acquisition unit
17 Captured image acquisition unit
18 Vector calculation unit
19 Representative point position calculation unit
20 Calculation execution unit
21 Gesture determination unit
22 Intersection calculation unit
23 Processing execution unit
24 Region setting unit
25 Hand
26 Skeleton point
27 Vector
28 Intersection
29 Predetermined image
30 Predetermined region
31 Rectangular region
32 Third position
33 Corrected third position
34 Fourth position
35 Corrected fourth position
36 Region
36a Band-shaped region
36b Band-shaped region
36c Band-shaped region
37 Distribution calculation unit
38 Estimation line setting unit
39 Distribution
40 Estimation line

The invention claimed is:

1. An information processing apparatus, comprising:
an acquisition unit configured to acquire a distance image that indicates a distance to each object within a range of a surface;
a vector calculation unit configured to calculate, for each direction pointed by a target object, a first vector that extends from the target object within the range of the surface based on the acquired distance image;
an intersection calculation unit configured to calculate a position of each intersection of a plurality of intersections of the surface and the first vector for the each direction pointed by the target object; and
a processing execution unit configured to:
calculate a first position of a specific representative point of a plurality of representative points from a first intersection of the plurality of intersections calculated before a specific time to a second intersection of the plurality of intersections calculated immediately before, wherein the first intersection is centred on the second intersection.

2. The information processing apparatus according to claim 1, wherein the target object is a finger.

3. The information processing apparatus according to claim 2, wherein
the plurality of representative points includes a first representative point of a hand, and
the vector calculation unit includes:
a representative point position calculation unit configured to calculate a position of the first representative point of the hand based on the acquired distance image, and
a calculation execution unit configured to calculate the first vector based on the calculated position of the first representative point.

4. The information processing apparatus according to claim 3, wherein
the representative point position calculation unit is further configured to estimate the position of the first representative point of the hand based on the acquired distance image and a learning model learned by teacher data, and
the teacher data a specific distance image of the hand and a specific position of the specific representative point in the acquired distance image.

5. The information processing apparatus according to claim 4, wherein
the plurality of representative points includes a second representative point on a wrist side and a third representative point on a fingertip side, and
the vector calculation unit is further configured to calculate a second vector toward the surface through a position of the second representative point and a position of the third representative point.

6. The information processing apparatus according to claim 4, further comprising a gesture determination unit configured to determine a pointing gesture with a finger based on the position of the first representative point,
wherein in a case the pointing gesture is performed, the vector calculation unit is further configured to calculate the first vector based on the position of the first representative point.

7. The information processing apparatus according to claim 6, wherein
the gesture determination unit is further configured to determine the pointing gesture based on the position of the first representative point and a learning model learned by teacher data, and
the teacher data includes the specific position of the specific representative point of the hand and information that indicates whether the position of the first representative point corresponds to a position of the specific representative point at a time of the pointing gesture.

8. The information processing apparatus according to claim 1, further comprising a captured image acquisition unit configured to acquire a captured image in the range in which the distance image is generated, wherein the processing execution unit is further configured to:
calculate, after a lapse of the specific time from the calculation of the first position, a second position that is a position of a representative point of the plurality of intersections from the first intersection to the second intersection and execute a specific process on a region in the captured image corresponding to the calculated first position and the second position.

9. The information processing apparatus according to claim 8, further comprising a region setting unit configured to set a plurality of rectangular regions, wherein
each of the plurality of rectangular regions includes at least a part of a character in the captured image,
the plurality of rectangular regions comprises a first rectangular region and a second rectangular region, and
the processing execution unit is further configured to:
calculate a third position that is a position in the captured image corresponding to the first position,
correct the calculated third position to a center position of the first rectangular region to which the third position belongs,
calculate a fourth position that is a position in the captured image corresponding to the second position,
correct the calculated fourth position to a center position of the second rectangular region to which the fourth position belongs, and
perform the specific process on the region in the captured image specified by the corrected third position and fourth position.

10. The information processing apparatus according to claim 8, further comprising:
a region setting unit configured to set a plurality of rectangular regions, wherein each of the plurality of rectangular regions includes at least a part of a character in the captured image;
a distribution calculation unit configured to calculate, for each position in a specific direction perpendicular to a writing direction of the character, a distribution of a sum of a number of pixels that belong to a specific rectangular region of the plurality of rectangular regions among pixels of the captured image, wherein the pixels of the captured image are in the writing direction; and
an estimation line setting unit configured to set an estimation line, which is a straight line that extends in the writing direction, at a distribution position where the distribution reaches a peak value, wherein
the peak value corresponds to a specific threshold or more among positions in the specific direction perpendicular to the writing direction, the processing execution unit is further configured to:
calculate a third position that is a position in the captured image corresponding to the first position,
correct the calculated third position to a position on the estimation line closest to the third position,
calculate a fourth position that is a position in the captured image corresponds to the second position,
correct the calculated fourth position to a position on the estimation line closest to the fourth position, and
perform the specific process on the region in the captured image specified by the corrected third position and fourth position.

11. The information processing apparatus according to claim 9, wherein the specific process includes an optical character recognition (OCR) processing to recognize the character and search processing to search for information that regards the character recognized by the OCR processing.

12. The information processing apparatus according to claim 1, wherein the processing execution unit is further configured to control a projection unit such that a specific image is projected at the position of the each intersection of the plurality of intersections.

13. The information processing apparatus according to claim 1, wherein the processing execution unit is further configured to display, on a display screen, a processing result.

14. An information processing method, comprising:
acquiring a distance image that indicates a distance to each object within a range of a surface;
calculating, for each direction pointed by a target object, a vector that extends from the target object within the range of the surface based on the acquired distance image;
calculating a position of each intersection of a plurality of intersections of the surface and the calculated vector for the each direction pointed by the target object; and
calculating a first position of a specific representative point of a plurality of representative points from a first intersection of the plurality of intersections calculated before a specific time to a second intersection of the plurality of intersections calculated immediately before, wherein the first intersection is centered on the second intersection.

* * * * *